United States Patent Office 3,394,140
Patented July 23, 1968

3,394,140
DIETHYL ESTER OF 4-PHENYL-1,4-PIPERIDINE-DICARBOXYLIC ACID
Solomon M. Kupchan, Madison, Wis., assignor to Smith Kline & French Laboratories, Philadelphia, Pa., a corporation of Pennsylvania
No Drawing. Filed Mar. 9, 1965, Ser. No. 438,398
2 Claims. (Cl. 260—294.3)

ABSTRACT OF THE DISCLOSURE

The diethyl ester of 4-phenyl-1,4-piperidinedicarboxylic acid prepared by reaction of ethyl 4-phenyl-4-piperidinecarboxylic acid with ethyl chloroformate has analgetic activity.

---

This invention relates to the novel diethyl ester of 4-phenyl-1,4-piperidinedicarboxylic acid which has analgetic activity. In addition to its analgetic activity this compound has a low physical dependence capacity as demonstrated in the monkey addiction test.

The novel compound of this invention is represented by the following structural formula:

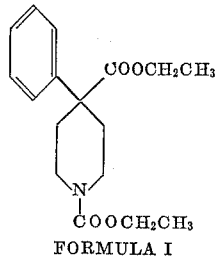

FORMULA I and is conveniently prepared by reaction of ethyl 4-phenyl-4-piperidinecarboxylic acid with ethyl chloroformate in the presence of for example, triethylamine in a suitable nonreactive organic solvent at from 10–25° C.

The compound of Formula I may be used as such or in the form of its nontoxic, pharmaceutically acceptable acid addition salts. Such salts are prepared from suitable acids such as inorganic acids, for instance hydrochloric, hydrobromic, sulfuric or phosphoric, or organic acids, for instance acetic, pamoic, succinic, maleic or ethanedisulfonic. The acid addition salts are prepared by reacting the base with either one equivalent of acid or preferably an excess of acid in an organic solvent such as ether or an alcohol-ether mixture.

The following example illustrates the preparation of the compound of this invention. It will be apparent to those skilled in the art that modifications of these procedures are possible. In addition it is obvious that the benzene ring of the compound of Formula I may be substituted by simple groups such as hydroxy, for example in the meta position; the piperidine ring may be substituted with a methyl group, for example in the 3-position; and the carboxylate groups may be carbomethoxy, each being the same or different.

EXAMPLE

Ethyl 4-phenyl-4-piperidinecarboxylic acid hydrochloride (8.07 g.) in 25 ml. of chloroform is cooled in an ice bath. A solution of 6.06 g. of triethylamine in 15 ml. of chloroform is added, followed by dropwise addition with stirring of 3.2 g. of ethyl chloroformate in 15 ml. of chloroform. The solution is kept cool for two hours and then allowed to warm to room temperature. After standing overnight, ether is added to the reaction mixture to precipitate all of the triethylamine hydrochloride and the mixture is filtered. The filtrate is extracted with water, dried and then vacuum evaporated. The residue is purified by recrystallization to give the diethyl ester of 4-phenyl-1,4-piperidinedicarboxylic acid, M.P. 37–38° C.

Treatment of the free base in ether solution with ethereal hydrogen chloride yields the hydrochloride salt.

What is claimed is:
1. A chemical compound selected from the group consisting of a free base and its nontoxic pharmaceutically acceptable acid addition salts, said free base having the formula:

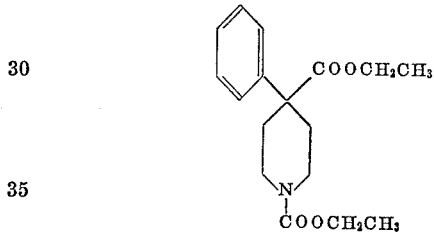

2. A chemical compound of the formula:

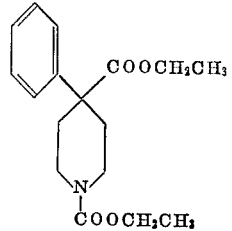

References Cited

UNITED STATES PATENTS 3,120,541 2/1964 Denss et al. _____ 260—294.3 X
3,249,618 5/1966 Denss et al. _____ 260—294.3 X JAMES A. PATTEN, *Primary Examiner*